Patented July 9, 1940

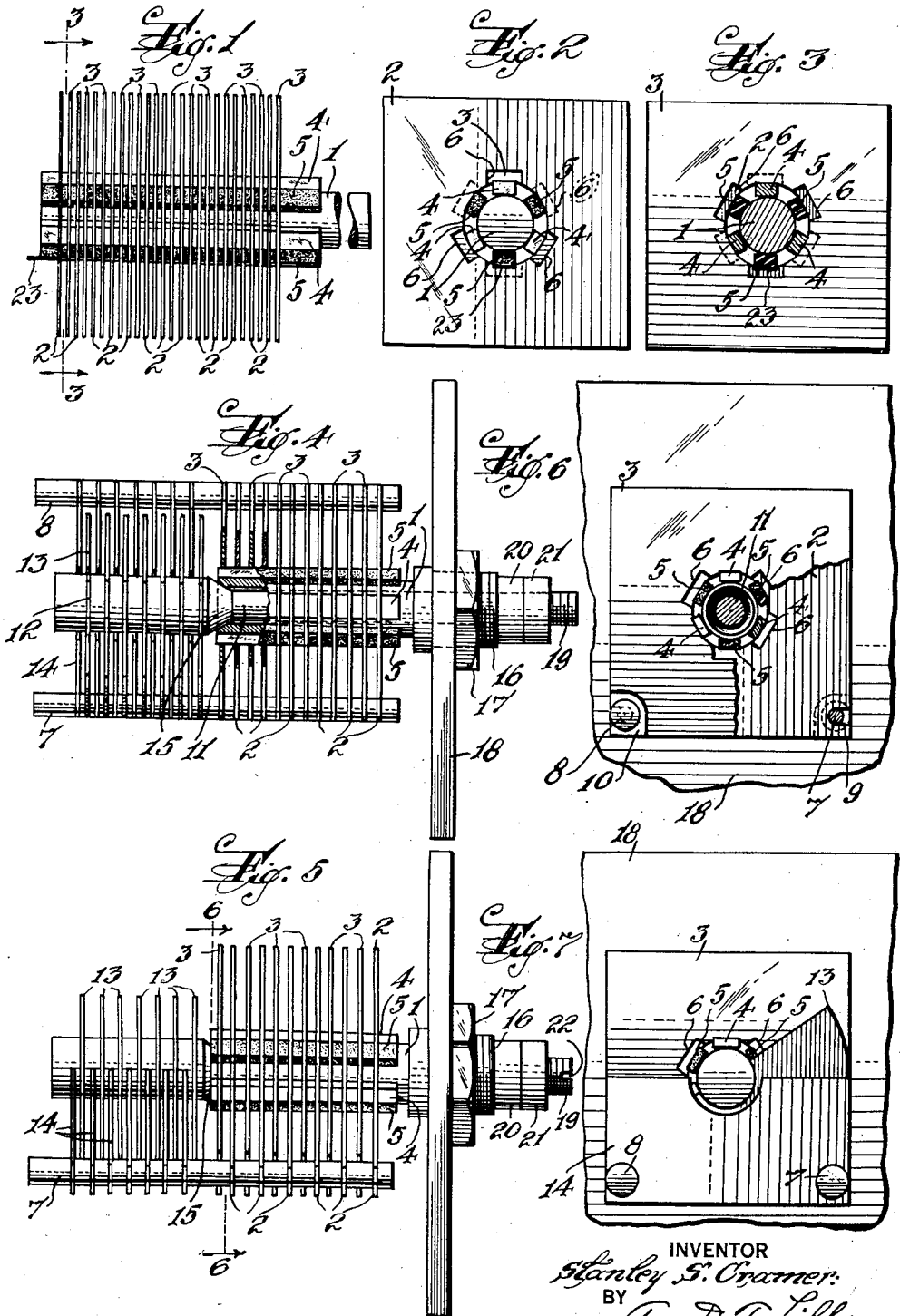

2,207,239

UNITED STATES PATENT OFFICE 2,207,239

ELECTRICAL CONDENSER

Stanley S. Cramer, Haddon Heights, N. J., assignor, by mesne assignments, to Condenser Development Corporation, Newark, N. J., a corporation of New Jersey Application March 12, 1938, Serial No. 195,502

11 Claims. (Cl. 175—41.5)

This invention relates to the design of a fixed electrical condenser which utilizes air as the dielectric.

In one form of application of the principle involved, a vernier or trimmer unit is associated with the main condenser in what I believe to be a new and novel manner, which combination is very useful in various parts of a radio receiving system, especially in the intermediate stages of a heterodyne hookup where many times a slight adjustment of the fixed condenser is of importance.

It is the principal object of the invention to provide a fixed condenser, using an air dielectric, which is cheap to manufacture, yet one that will hold its capacity over a long period of time.

Other objects will be apparent to one skilled in this art, on a reading of the following specification taken in connection with the annexed drawing, wherein:

Figure 1 is a plan view, on a much enlarged scale, of my improved form of fixed condenser.

Figure 2 is an end view of Figure 1.

Figure 3 is a view on the line 3—3 of Figure 1.

Figure 4 is a plan view, on a much enlarged scale, of the condenser shown in Figure 1, combined with a vernier or trimmer device, the rotor of the trimmer device being partly displaced from its full engaging position with the stator, a portion of the construction being broken away to show certain details.

Figure 5 is a side elevation of Figure 4.

Figure 6 is a view on the line 6—6 of Figure 5.

Figure 7 is an end view of Figure 5, looking from left to right.

Figures 1, 2 and 3 illustrate the principles involved in my improved construction. In these figures, 1 is an assembly stud on which are mounted a plurality of plates which are numbered 2 and 3 and which, in Figure 1, are alternately arranged. Each of the plates has a centrally located hole therein which is considerably larger in diameter than the diameter of the stud 1. For holding the plates 2 and 3 in proper spaced relation on the stud 1, there are used a plurality of metal keys 4 and a plurality of keys 5 of insulating material. These are alternately arranged as shown in Figures 2 and 3 and are preferably symmetrically spaced around the stud 1. In assembly, the condenser plates 2 and 3 are held in a suitable spacing fixture and the keys 4 and 5 forced into position between the stud 1 and the inner periphery of the hole through the plates.

As shown in Figure 2, the plate 2 is provided with notched out portions 6 which are larger than the metal keys 4 so that the keys 4 will not contact with this particular plate or plates which are held securely in position by the gripping action of the keys 5.

In Figure 3, the plate 3, which may be the same as 2 but shifted 180°, is placed so that the keys 4 will make mechanical and electrical contact therewith. To save die construction, the plates 2 and 3 may be identical but shifted as above indicated. In order to electrically connect the alternate plates 2 supported on the insulators 5, I provide a thin metal strip 23 on top of one or more of the insulators 5. Since these metal strips are in alignment with notches 6 of plates 3, no contact will be made therewith. Electrical connection to the condenser can then be made by connecting lead wires to the strip or strips 23, one of which is preferably extended at one end, and to the stud 1 or to a key 4. The condenser thus described is preferably mounted by the stud 1.

In Figure 4, I have indicated how the plates of the condenser may be connected in a different way, and as shown, two rods 7 and 8, are used for this purpose. The rods are grooved to correspond with the spacing of the plates 2 which have notches 9 therein to receive the grooved part of the rods 7 and 8. The plates 3 are notched out at 10 to provide clearance around the rods 7 and 8 which also act as connectors for the plates 2.

In Figure 4 the stud 1 is hollow and is adapted to receive a shaft 11, one end of which is provided with spaced grooves at 12 to receive a plurality of small plates 13 which may be any desired shape, those indicated being semi-circular. Carried on the studs 7 and 8, in suitable grooves, are a group of stator plates 14 which, it will be understood, are, through the medium of the studs 7 and 8, electrically connected with the plates 2 of the main condenser.

The shaft 11, adjacent the vernier trimmer group of plates, is tapered at 15 to fit a conical seat in the stud 1 which is threaded at 16 at its outer end and clamped by a nut 17 to a mounting plate 18. The shaft 11 has its end threaded at 19 to receive clamping nuts 20 and 21 which are drawn up tightly so as to produce a relatively large amount of friction at the seat 15, whereby the small vernier or trimmer condenser will hold a fixed position when the shaft is adjusted by means of a screw driver engaging the slot 22 in the end of the shaft 11.

Stated in another way, this frictional mounting of the vernier condenser is such that it will stand tremendous vibration and rough handling without changing its set position, so that when the condenser has been connected into a circuit and the variable trimmer portion set to vary the capacity of the main, fixed condenser, it will retain its adjustment.

A condenser as described, particularly the form of construction shown in Figure 4, is adapted for use in connection with what may be termed "button tuning." By this I mean that a plurality of these fixed condensers, one for each stage of amplification, may be connected so as to be controlled by a single button, preferably of the push-button type, so that the mere act of pushing the button will bring in the desired station, but this particular application of my invention will be made the subject of a separate application.

It will be obvious that certain of the details may be varied without departing from the spirit of the invention and the scope of the appended claims.

What I claim is:

1. In an electrical condenser, a series of spaced metallic plates each having a centrally located hole therein, a mounting stud located in said hole and keys arcuately spaced around the stud and wedged between the stud and the periphery of the hole in the plates, the keys being alternately of metal and insulating material, the plates having notches arcuately positioned around the hole and being arranged so the notches in alternate plates are radially in alignment with the metal keys, the notches being of a size so the metal keys will not contact with the plates arranged to have said notches so located, a metal strip on at least one of the insulating keys and contacting with alternate plates not engaged by said metal keys.

2. In an electric condenser, a series of spaced metallic plates each having a centrally located hole therein, a mounting stud located in said hole and keys arcuately spaced around the stud and wedged between the stud and the periphery of the hole in the plates, the keys being alternately of metal and insulating material, each plate having a notch for each metal key arcuately positioned around the hole, but the plates being positioned so only alternate plates have these notches in radial alignment with the metal keys, the notches being of a size so the metal keys will not contact with the plates arranged to have the notches therein in alignment with the metal keys, a metal strip on at least one of the insulating keys and contacting with alternate plates not engaged by said metal keys.

3. In an electrical condenser, a series of spaced metallic plates each having a centrally located hole therein, a mounting stud located in said hole and keys arcuately spaced around the stud and wedged between the stud and the periphery of the hole in the plates, some of the keys being of metal and some of insulating material, at least alternate plates having notches therein in radial alignment with the metal keys and the notches being of a size so the metal keys will not contact with these plates, thereby insulating every other plate from the assembly stud, with means for electrically connecting these insulated plates together.

4. A unitary electrical condenser construction including a permanently fixed condenser and a variable condenser of the rotary type, a single fixed hollow assembly stud for carrying both condensers as their only support, a series of spaced metallic plates comprising the fixed condenser, each having a hole therein to receive said stud, and keys arcuately spaced around the stud and wedged between the stud and the periphery of the hole in the plates of the fixed condenser, some of the keys being of metal and some of insulating material, at least alternate plates having notches therein in radial alignment with the metal keys and the notches being of a size so the metal keys will not contact with these plates, thereby insulating every other plate from the assembly stud, with means for electrically connecting these insulated plates together, said means including connecting rods, said rods being extended and having mounted thereon additional spaced plates comprising the stator element of the rotatable type trimmer condenser, a shaft carried directly by the stud, said trimmer condenser having spaced rotor plates mounted on said shaft and function means for locking said shaft in a predetermined set position.

5. In a unitary electrical condenser construction including a permanently fixed condenser and a variable condenser, a single fixed centrally located hollow assembly stud for carrying both condensers, a series of spaced metallic plates directly mounted on said stud, said mounting comprising keys of metal and insulating material arcuately and alternately arranged and tightly wedged between the stud and the periphery of a hole in the plates, at least certain of the plates having notches therein and arranged so the same type of keys wedge on alternate plates, rods connecting the plates wedged by the insulating keys, the variable condenser being of the rotary type and having stator plates electrically connected to said rods, and rotor plates carried directly on a shaft which extends through said hollow assembly stud, and means for locking the shaft to the stud.

6. An electrical condenser comprising a single centrally located supporting stud and a plurality of plates carried on the stud in spaced relation having air as the dielectric between the plates, means comprising metal keys arcuately spaced around the stud and extending longitudinally thereof and in contact therewith, and contacting with alternate plates for electrically connecting said alternate plates together, and means comprising insulating keys arcuately spaced around the stud and extending longitudinally thereof and engaging at least the plates not engaged by said metal keys for insulating them from the other plates.

7. In the combination of a permanently fixed and a variable condenser, a single fixed supporting stud for both condensers, the plates of the fixed condenser being mounted in spaced relation directly on the stud, means for connecting the plates of one polarity together and means for insulating these plates from the stud, the stator plates of the variable condenser being carried by the same means which connect together the insulated plates, while the rotor plates of the variable condenser are supported by said stud in a fixed and final position.

8. In a unitary electrical construction including a permanently fixed and a variable condenser comprising a single fixed support stud for both, the plates of the fixed condenser being mounted directly on said stud, alternate plates being insulated therefrom with means for electrically connecting these last-mentioned plates, the stator plates of the variable condenser being carried by said last-mentioned means, a shaft carrying the rotor plates and supported by said stud and means for setting and holding the shaft in a fixed and final position.

9. In the combinaiton of a permanently fixed and a variable condenser, a single fixed stud supporting both condensers, the stud passing through the fixed condenser plates and carrying means for anchoring the plates directly thereon in spaced and insulating relationship thereto, a shaft for the rotor plates of the variable condenser passing through and supported by the said stud, and means for supporting the stator plates, said means acting as means for electrically connecting one group of the fixed condenser plates.

10. An electrical condenser construction including a permanently fixed condenser and a variable condenser having a rotary shaft, a single fixed metal stud for directly supporting both condensers, the rotary shaft being seated in and supported by said stud, with means thereon for securing a strong frictional engagement between the shaft and stud for maintaining a fixed and final setting position of the shaft, means for supporting the stator plates of the variable condenser, said last-mentioned means acting to electrically connect together one group of the fixed condenser plates with the stator plates of the variable condenser, the other group of plates being electrically connected to said stud.

11. A unitary electrical condenser construction including two groups of permanently fixed cooperating plates and a variable condenser having stator and rotor groups of plates, the latter group having a shaft for carrying them, a fixed stud for directly supporting the shaft as well as the two groups of fixed condenser plates and the stator plates of the variable condenser, the rotor plates being electrically in parallel with one group of the fixed condensers, and the stator group of plates being electrically in parallel with the other group of plates of the fixed condenser and means for maintaining said shaft in the stud in a fixed and final position.

STANLEY S. CRAMER.

CERTIFICATE OF CORRECTION.

Patent No. 2,207,239.  July 9, 1940.

STANLEY S. CRAMER.

It is hereby certified that error appears in the printed specification of the above numbered patent requiring correction as follows: Page 2, second column, line 20, claim 4, for the word "function" read --friction--; and that the said Letters Patent should be read with this correction therein that the same may conform to the record of the case in the Patent Office.

Signed and sealed this 13th day of August, A. D. 1940.

(Seal)

Henry Vah Arsdale,
Acting Commissioner of Patents.